US005463559A

United States Patent [19]

Kirkpatrick et al.

[11] Patent Number: 5,463,559

[45] Date of Patent: Oct. 31, 1995

[54] DIAGNOSTIC APPARATUS FOR AN ELECTRONIC CONTROLLER

[75] Inventors: Paul A. Kirkpatrick, Charlotte; James D. Mehaffey, Mooresville, both of N.C.

[73] Assignee: Ingersoll-Rand Company, Woodcliff Lake, N.J.

[21] Appl. No.: 93,418

[22] Filed: Jul. 19, 1993

[51] Int. Cl.[6] .......... G05B 23/00; G05B 23/02

[52] U.S. Cl. .......... 364/483; 364/551.01; 364/579

[58] Field of Search .......... 371/24, 25.1, 26, 371/15.1; 364/551.01, 483, 551.02, 579, 580, 186; 415/16, 17

[56] References Cited

U.S. PATENT DOCUMENTS

| | | | |
|---|---|---|---|
| 3,774,051 | 11/1973 | Chandler et al. | 307/203 |
| 3,829,842 | 8/1974 | Langdon et al. | 340/172.5 |
| 4,292,806 | 10/1981 | Moore et al. | 415/17 X |
| 4,502,833 | 3/1985 | Hibino et al. | 415/17 X |
| 4,535,456 | 8/1985 | Bauer et al. | 371/16.1 |
| 4,949,276 | 8/1990 | Staroselsky et al. | 415/17 X |
| 4,990,057 | 2/1991 | Rollins | 417/12 |
| 5,054,995 | 10/1991 | Haseley et al. | 415/17 |
| 5,182,755 | 1/1993 | Sekiguchi et al. | 364/186 |

*Primary Examiner*—Emanuel T. Voeltz
*Assistant Examiner*—M. Kemper
*Attorney, Agent, or Firm*—Victor M. Genco, Jr.; John J. Selko

[57] ABSTRACT

A portable electronic apparatus tests and diagnoses an electronic controller of a machine. The electronic apparatus includes an AC voltage detection means for sequentially detecting at least one high level AC voltage signal generated by at least one electronic controller output. A converter converts the at least one high level AC voltage signal to at least one low level DC voltage signal which simulates a low level contact closure input. A means is provided which sequentially inputs the at least one low level DC voltage signal to a low level DC voltage input of the electronic controller for detection by the electronic controller. A generator generates at least one analog voltage signal which simulates at least one known, fixed value operating parameter of the machine. A means is provided which inputs the at least one analog voltage signal to a predetermined electronic controller input for detection by the electronic controller. An indicator sequentially indicates the detection of the at least one high level AC voltage signal, the detection of the at least one low level DC voltage signal, and the detection of the at least one analog voltage signal.

12 Claims, 4 Drawing Sheets

DIAGNOSTIC APPARATUS FOR AN ELECTRONIC CONTROLLER

BACKGROUND OF THE INVENTION

This invention generally relates to electronic controllers for machines, and more particularly to a diagnostic apparatus for a microprocessor based electronic controller for a compressor.

The implementation of electronic compressor control devices has created the need for improved methods of electronic controller diagnostics. Electronic hardware is difficult to analyze in field applications where present test methods are not practical. To date, previous methods for full diagnostic testing of electronic controllers have been accomplished by using simulators, functional test sets, and manual test instruments requiring constant human interaction. These methods are tedious requiring the use of bulky and expensive equipment. Additionally, constant effective human interaction is not always possible in such instances where a unit is being tested in a heat chamber, or in such instances where the electronic portions of the controllers must be continuously, and rapidly, exercised in time intervals of hundreds or thousands of hours. The need for portable, user-friendly, automated, full diagnostic testing is vital for effective functional testing of an electronic controller, for controller burn-in, for quality control auditing and for other various field test applications.

The foregoing illustrates limitations known to exist in present methods and devices for full diagnostic testing of microprocessor-based electronic controllers for machines, such as compressors, for example. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for testing and diagnosing an electronic controller of a machine. The apparatus includes an AC voltage detection means for sequentially detecting at least one high level AC voltage signal generated by at least one electronic controller output. A converter converts the at least one high level AC voltage signal to at least one low level DC voltage signal which simulates a low level contact closure input. A means is provided which sequentially inputs the at least one low level DC voltage signal to a low level DC voltage input of the electronic controller for detection by the electronic controller. A generator generates at least one analog voltage signal which simulates at least one known, fixed value operating parameter of the machine. A means is provided which inputs the at least one analog voltage signal to a predetermined electronic controller input for detection by the electronic controller. An indicator sequentially indicates the detection of the at least one high level AC voltage signal, the detection of the at least one low level DC voltage signal, and the detection of the at least one analog voltage signal.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
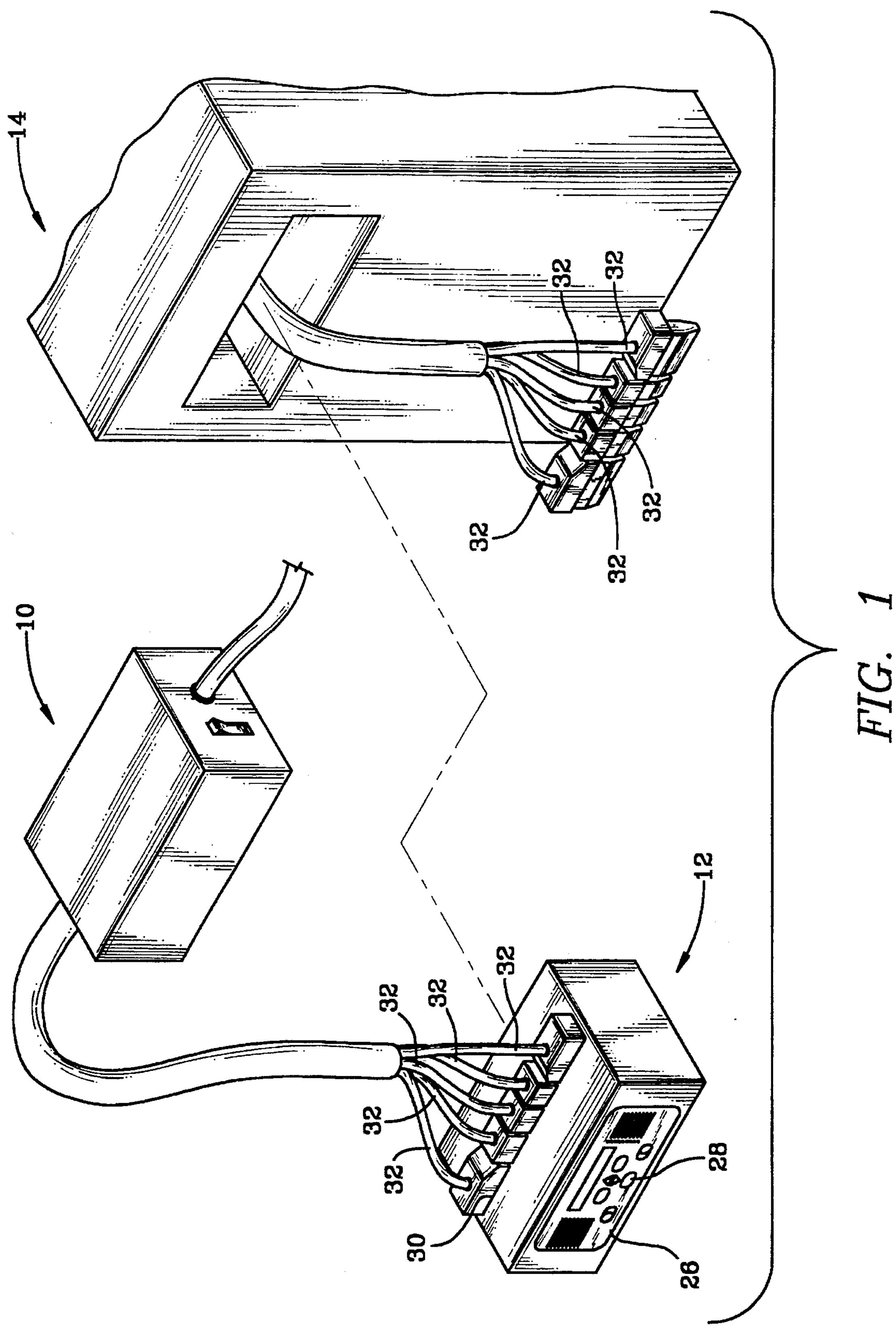
FIG. 1 is an environmental view of the apparatus of the present invention which is operatively connected to an electronic controller of a compressor.
Figure 2:
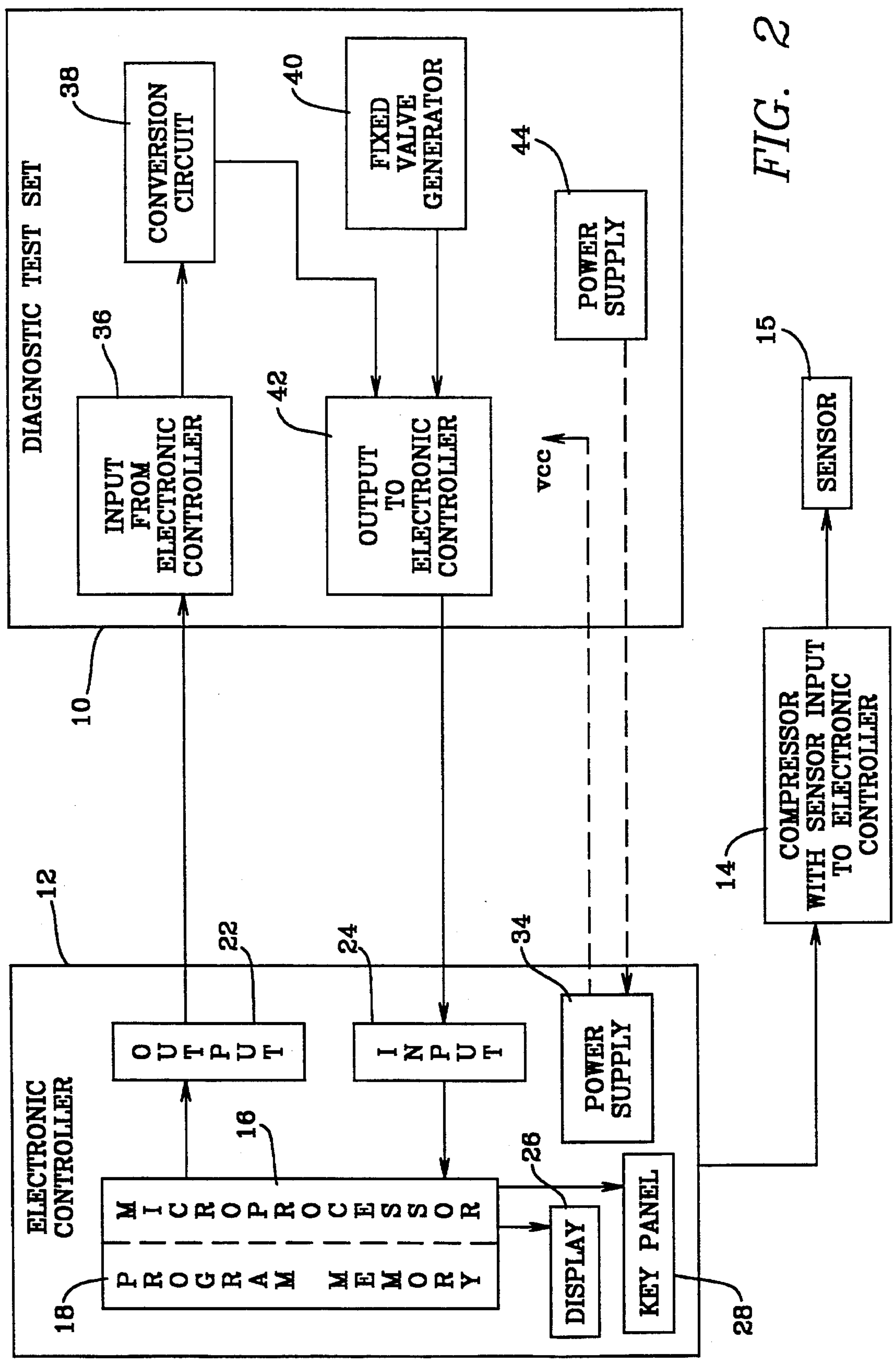
FIG. 2 is a functional block diagram of the apparatus of the present invention.
Figure 4:
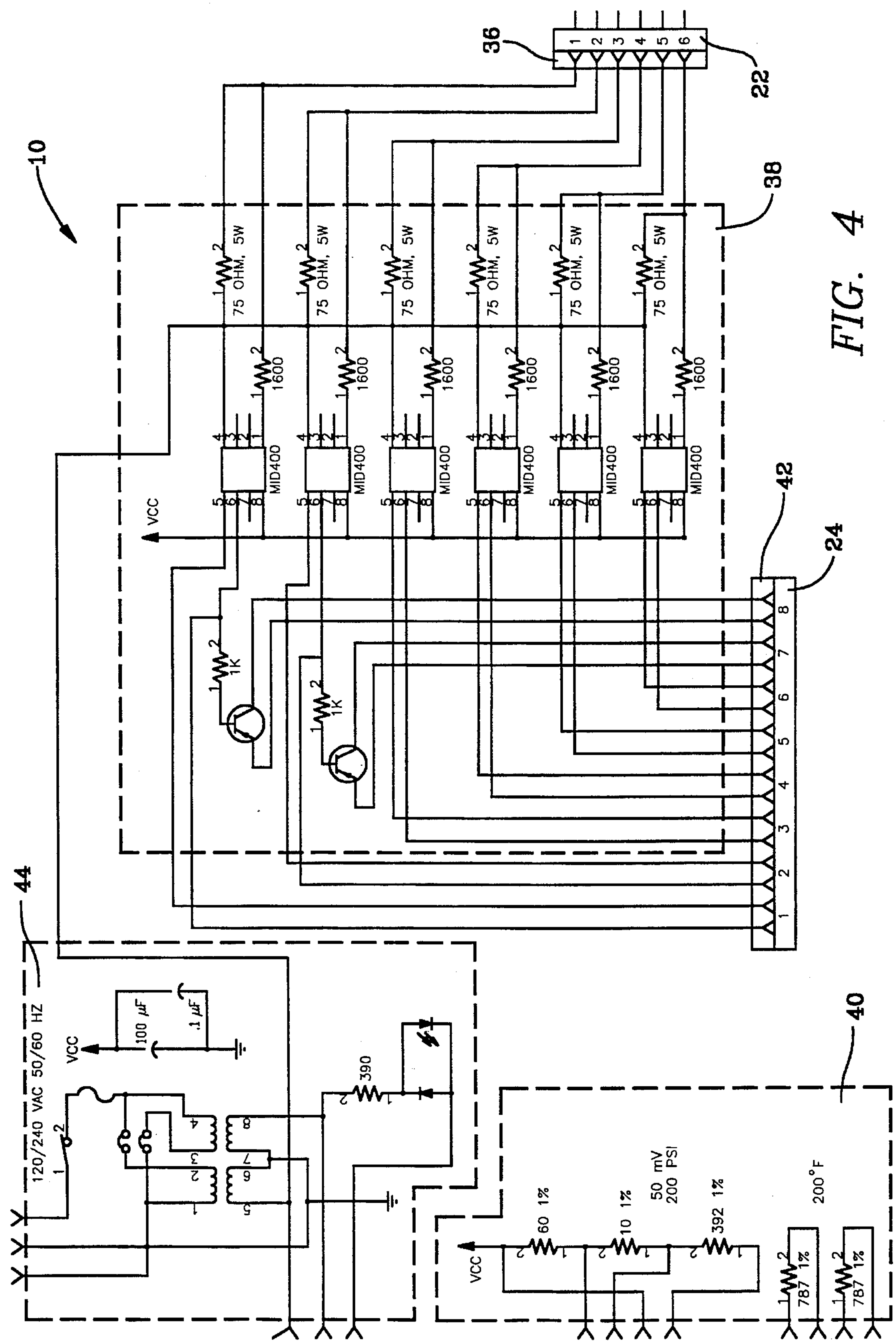
FIG. 4 is an electrical schematic of a preferred embodiment of the apparatus of the present invention.

Referring more particularly to the drawings, the diagnostic apparatus of the present invention is generally indicated at numeral 10 in FIGS. 1, 2 and 4. As showed therein, the apparatus 10 is operable to provide a portable means for testing, diagnosing, and exercising an electronic controller 12 for a machine, such as an compressor 14 having an inlet and a discharge (not shown). The term compressor as used herein applies to pumps and compressors, as well as any device which displaces a working fluid under pressure. A working fluid, as used herein, is intended to mean any fluid including gases, typically air, or liquids.

The compressor 14 may be a rotary-screw type, a centrifugal type, or any other well known type compressor. At least one sensor 15 is operatively connected to a compressor element for sensing the operating parameters of at least one compressor function. For example, the compressor 14 may include a pressure sensor for measuring the compressed fluid pressure at the discharge of the compressor, or a temperature sensor for determining the temperature of the compressed fluid at a predetermined location in the compressor.

The electronic controller 12 controls the operation of the compressor 14 in direct response to data received from the sensor 15. An example of such an electronic controller for controlling operation of a compressor is fully described in U.S. Pat. No. 5,054,995, which is specifically incorporated herein by reference.

As illustrated in FIG. 2, the electronic controller 12 includes a microprocessor 16 and a program memory 18. The logic for controlling operation of the diagnostic apparatus 10 is contained within the microprocessor 16. The electronic controller indicates and displays operating parameters and functions of the compressor 14, permits a user to set limits for the operating parameters, and controls the compressor in response to any of the operating parameters reaching a preset level of a corresponding function. The electronic controller has a predetermined number of triac controlled outputs 22 for providing an electric signal, such as a high level AC voltage signal, to predetermined compressor elements. In the preferred embodiment, the outputs 22 provide a 16 volt AC signal, and communicate with such compressor elements as an electric driving motor and an electrically controllable solenoid valve which controls compressor operating parameters. The controller 12 also includes an alarm relay output, which may be either normally closed or normally open, and which is fault activated. The alarm relay is used by the apparatus 10 to toggle a control voltage signal, the purpose of which is described in further detail hereinafter.

The electronic controller 12-includes a predetermined number of inputs 24 to the controller such as a plurality of low level DC voltage inputs which are operatively connected to such compressor elements as starter contacts, sensors, motor overload detection devices, remote start/stop relays, and emergency stop relays, for example. At least one controller sensor input receives an analog voltage signal containing data measured by the compressor sensors, such as the pressure sensors or the temperature sensors. A controller input voltage monitor detects control voltage to determine whether a power failure input has been received by the controller.

FIG. 1 illustrates an electronic controller display panel 26 having a membrane type keyboard 28 which permits a user to interface with the electronic controller 12 and the compressor 14, and which displays operating parameters and functions which have been selected through the keyboard membrane switches. As illustrated in FIG. 1, the electronic controller has a plurality of individually shaped electric cable receiver blocks, or terminals 30. The individual terminals 30 receive mating individually shaped cables 32 from predetermined compressor elements when the controller is operatively connected to the compressor during compressor operation. Also, the individual terminals 30 receive mating individually shaped cables 32 from the apparatus 10 during periods of testing and diagnosis when the electronic controller 12 is operatively connected to the diagnostic apparatus 10. As illustrated in FIG. 2, a controller power supply 34 receives electrical power either from the compressor during compressor operation, or from the apparatus 10 during periods of testing and evaluation of the electronic controller 12.

The apparatus 10 is illustrated by the functional block diagram of FIG. 2. Also, a preferred embodiment of the apparatus 10 is illustrated by way of the schematic of FIG. 4. Referring to FIGS. 2 and 4, the apparatus 10 is a remote, portable apparatus which has an input 36 for receiving at least one signal from the electronic controller 12, a conversion circuit 38, a fixed value generator 40, an output 42 to the electronic controller 12 and a power supply 44.

In the preferred embodiment, the input 36 is an AC voltage detection means which sequentially detects at least one high level AC voltage signal from the triac controlled outputs 22. The conversion circuit 38 converts individual high level AC voltage signals received from the electronic controller 12 to individual low level DC voltage signals, such as 5 volt DC signals for example. The individual low level DC voltage signals each simulate a low level contact closure input. As best seen by reference to FIG. 4, the preferred embodiment of the apparatus 10 receives six input signals from the electronic controller 12, although the apparatus 10 generates eight output signals. Accordingly, the conversion circuit 38 includes a voltage detection means, such as a predetermined number of transistors, for example, which permits the conversion circuit to convert a single high level AC voltage signal to one or more DC voltage signal of equal voltage. For example, as best seen by reference to FIG. 4, the high level AC voltage signal received by input #1, of the input 36, is converted into two low level DC voltage signals which are individually outputted to the electronic controller by way of outputs #1 and #8, of the output 42. Also, the high level AC voltage signal received by input #2, of the input 36, is converted into two low level DC voltage signals which are individually outputted to the electronic controller by way of outputs #2 and #7, of the output 42.

The fixed value generator 40 generates an analog voltage signal which simulates at least one known, fixed value operating parameter of the compressor 14. For example, as illustrated in FIG. 4, the fixed value generator includes circuitry which is operable to generate a 750 mV signal which is detected by the controller 12 as a 200 PSI pressure signal. Further, the fixed value generator 40 includes circuitry which is operable to generate a 50 mV signal which is detected by the controller as a 200° F. temperature signal.

As best seen by reference to FIGS. 2 and 4, the individual low level DC voltage signals and the analog voltage signals are sequentially inputted from the electronic test apparatus 10 to a low level DC voltage input of the electronic controller for detection by the electronic controller. The display panel 26 of the electronic controller 12 is operable to sequentially indicate the detection of the high level AC voltage signals, the detection of the low level DC voltage signals, and the detection of the analog voltage signals.

Figure 3:
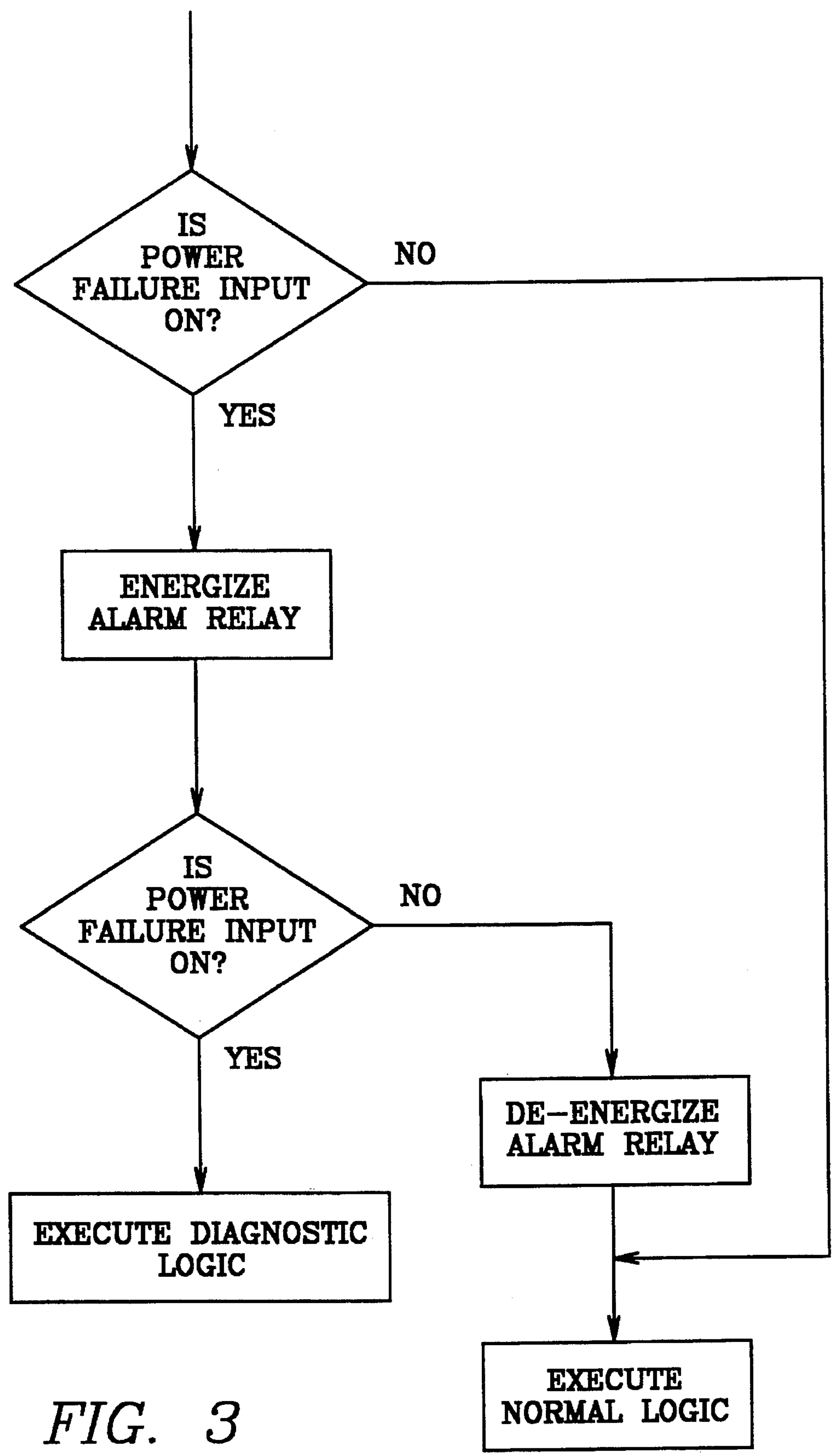
FIG. 3 is a flow diagram of a method of identifying an operative coupling of the apparatus of the present invention to an electronic controller of a compressor.

As illustrated by FIGS. 2 and 3, in operation, the electronic controller 12 initially identifies the operative coupling of the apparatus 10 to the electronic controller 12. In this regard, at power up of the compressor 14, the input voltage monitor of the electronic controller initiates a search for a control voltage signal. If the control voltage signal is detected, the electronic controller executes normal compressor functions. Conversely, if a control voltage signal is not detected, the electronic controller energizes the alarm relay which permits a control voltage to be supplied to the electronic controller from the electronic test apparatus. Thereafter, the electronic controller again initiates a search for the control voltage signal. If a control voltage signal is not detected, the alarm relay is de-energized and the electronic controller executes normal logic functions. Conversely, if a control voltage signal is detected, the electronic controller executes the diagnostic logic sequence for controlling operation of the apparatus 10.

The test routine for the electronic test apparatus is an automated loop test that will repeat itself continuously until terminated by a user. During operation, the triac controlled outputs 22 are energized in a sequential order from triac 1 to triac 6. When an output is energized, a low level contact closure input is simulated and outputted to the input 24 of the electronic controller from the output 42 of the diagnostic apparatus. The input/output routine expects to see the following input for a given output:

| OUTPUT | INPUT (contact closed) |
|---|---|
| Triac 1 energized | Input 1 and Input 8 |
| Triac 2 energized | Input 2 and Input 7 |
| Triac 3 energized | Input 3 |
| Triac 4 energized | Input 4 |
| Triac 5 energized | Input 5 |
| Triac 6 energized | Input 6 |

The pressure input of the electronic controller is supplied a simulated 200 PSI input, and the temperature input of the electronic of the electronic controller is supplied a 200° F. input. Upon receiving the respective sequential inputs, the display of the controller indicates the detection of the inputs with suitable symbols. If any elements fail in operation during the test, the test routine is halted, and a failed test message is displayed by the electronic controller.

While this invention has been illustrated and described in accordance with a preferred embodiment, it is recognized that variations and changes may be made therein without departing from the invention as set forth in the following claims.

Having described the invention, what is claimed is:

1. A portable diagnostic apparatus for an electronic controller of a machine, the electronic controller having a microprocessor and a program memory, the electronic controller having therein logic means for controlling the diagnostic apparatus and means for selectively connecting and disconnecting the machine being controlled from the electronic controller, the diagnostic apparatus comprising:

AC voltage detection means for sequentially detecting at least one high level AC voltage signal generated by at least one electronic controller output;

conversion means for converting the at least one high level AC voltage signal to at least one low level DC voltage signal which simulates a low level contact closure input;

means for generating at least one analog voltage signal which simulates at least one known, fixed value operating parameter of the machine;

means for sequentially outputting the at least one low level DC voltage signal and the at least one analog voltage signal to a low level DC voltage input of the electronic controller for processing by the microprocessor of the electronic controller thereby providing for automatic testing, diagnosing and exercising of the electronic controller in response to simulated operating parameters of the machine; and means for selectively connecting and disconnecting the electronic controller from the diagnostic apparatus.

2. An apparatus, as claimed in claim 1, and wherein the apparatus is a remote, portable diagnostic apparatus.

3. An apparatus, as claimed in claim 1, and wherein the machine is a compressor.

4. An apparatus, as claimed in claim 1, and wherein the logic for controlling operation of the apparatus is contained within the electronic controller.

5. An apparatus, as claimed in claim 1, and wherein the at least one high level AC voltage signal generated by the at least one electronic controller output is a 16 volt signal.

6. An apparatus, as claimed in claim 1, and wherein the conversion means converts the at least one high level AC voltage signal to a 5 volt DC signal.

7. An apparatus, as claimed in claim 3, and wherein the means for generating the at least one analog voltage signal simulates a working fluid pressure.

8. An apparatus, as claimed in claim 3, and wherein the means for generating the at least one analog voltage signal simulates a working fluid temperature.

9. An apparatus, as claimed in claim 1, and wherein the electronic controller identifies the operative coupling of the apparatus to the electronic controller, whereby the electronic controller initiates a search for a first control voltage signal;

executes normal, predetermined logic routines of the electronic controller if a control voltage signal is detected;

energizes an-alarm relay if a control voltage signal is not detected;

initiates a search for a second control voltage signal; de-energizes the alarm relay and executes the normal, predetermined logic routines of the electronic controller if a control voltage signal is not detected; and executes a predetermined diagnostic logic sequence if a control voltage signal is detected.

10. A system for testing, diagnosing and exercising an electronic controller of a compressor, the system comprising:

a unit under test which includes:

a) a compressor for pressurizing a fluid, the compressor having an inlet and a discharge;

b) at least one sensor capable of sensing at least one function of the compressor;

c) an electronic controller for indicating operating parameters and functions of the compressor, for graphically displaying the operating parameters and functions, for setting limits of the operating parameters and controlling the compressor in response to any of the operating parameters reaching a preset level of a corresponding function, the electronic controller including at least one AC digital voltage output, at least one low level DC digital voltage input, a microprocessor, a program memory, and at least one sensor input, and means for selectively connecting and disconnecting the compressor from the electronic controller;

a remote, portable apparatus for testing and diagnosing the unit under test, the apparatus being controlled by the electronic controller, the apparatus including:

a) AC voltage detection means for sequentially detecting at least one high level AC voltage signal generated by at least one electronic controller output;

b) conversion means for converting the at least one high level AC voltage signal to at least one low level DC voltage signal which simulates a low level contact closure input;

c) means for generating at least one analog voltage signal which simulates at least one known, fixed value operating parameter of the compressor;

d) means for sequentially outputting the at least one low level DC voltage signal and the at least one analog voltage signal to a low level DC voltage input of the electronic controller for processing by the microprocessor of the electronic controller thereby providing for automatic testing, diagnosing and exercising of the electronic controller in response to simulated operating parameters of the compressor;

e) the electronic controller having logic means therein for controlling operation of the testing and diagnosing apparatus; and f) means for selectively connecting and disconnecting the electronic controller from the diagnosing and testing apparatus.

11. A system for testing and diagnosing an electronic controller of a compressor, as claimed in claim 10, and wherein the electronic controller identifies the operative coupling of the remote, portable apparatus to the electronic controller, whereby the electronic controller initiates a search for a first control voltage signal;

executes normal logic functions of the electronic controller if a control voltage signal is detected;

energizes an alarm relay if a control voltage signal is not detected;

initiates a search for a second control voltage signal;

de-energizes the alarm relay and executes normal electronic controller logic functions if a control voltage signal is not detected; and executes a diagnostic logic sequence if a control voltage signal input is detected.

12. A method of testing, diagnosing and exercising an electronic controller of a compressor, the compressor having at least one sensor capable of sensing at least one compressor function, the electronic controller including at least one high level AC voltage output, at least one low level DC voltage input, a microprocessor and a program memory, and at least one sensor input, the method of testing and diagnosing the electronic controller comprising the steps of:

electrically disconnecting the compressor from the controller;

electrically connecting the controller to a portable diagnostic unit;

energizing the at least one high level AC voltage output of the electronic controller to generate at least one high level AC voltage signal;

sequentially detecting the at least one high level AC voltage signal in the diagnostic unit;

converting the at least one high level AC voltage signal in the diagnostic unit to at least one low level DC voltage signal which simulates an individual low level contact closure input;

generating at least one analog voltage signal in the diagnostic unit which simulates a known, fixed value operating parameter of the compressor; and sequentially outputting from the diagnostic unit the at least one low level DC voltage signal and the at least one analog voltage signal to a low level DC voltage input of the electronic controller;

processing the low level DC voltage input in logic contained in the electronic controller, thereby providing for automatic testing, diagnosing and exercising of the electronic controller in response to simulated operating parameters of the compressor.

* * * * *